(12) United States Patent
Holmes

(10) Patent No.: US 10,896,406 B2
(45) Date of Patent: Jan. 19, 2021

(54) INSIGHT FRAMEWORK FOR SUGGESTING HOSTED SERVICE AND FEATURES BASED ON DETECTED USAGE PATTERNS AND BEHAVIORS

(71) Applicant: MICROSOFT TECHNOLOGY LICENSING, LLC, Redmond, WA (US)

(72) Inventor: William H. Holmes, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

(21) Appl. No.: 15/424,300

(22) Filed: Feb. 3, 2017

(65) Prior Publication Data

US 2018/0225635 A1 Aug. 9, 2018

(51) Int. Cl.
G06Q 10/10 (2012.01)
G06Q 10/06 (2012.01)
G06Q 10/02 (2012.01)

(52) U.S. Cl.
CPC ......... *G06Q 10/1095* (2013.01); *G06Q 10/02* (2013.01); *G06Q 10/06314* (2013.01); *G06Q 10/109* (2013.01)

(58) Field of Classification Search
CPC .... G06Q 10/1095; G06Q 10/10; G06Q 10/06; G06Q 10/06311; G06Q 10/063116; G06Q 10/06314
See application file for complete search history.

(56) References Cited

U.S. PATENT DOCUMENTS

| | | | |
|---|---|---|---|
| 8,055,546 B1 | 11/2011 | Cassone et al. | |
| 8,452,797 B1 | 5/2013 | Paleja et al. | |
| 8,484,099 B1 | 7/2013 | Pope et al. | |
| 8,856,670 B1 | 10/2014 | Thakur et al. | |
| 9,002,991 B2 * | 4/2015 | Fletcher | H04N 21/2221 709/219 |

(Continued)

OTHER PUBLICATIONS

Agrawal, Pulkit, "How to Use Release Notes to Drive Feature Adoption", https://www.trychameleon.com/blog/2016/09/12/release-notes-for-feature-adoption, Published on: Sep. 12, 2016, 16 pages.

(Continued)

*Primary Examiner* — Matthew S Gart
*Assistant Examiner* — Stephen S Swartz
(74) *Attorney, Agent, or Firm* — Michael Best & Friedrich LLP

(57) ABSTRACT

Technologies are described for an insight framework for suggesting shared calendar events based on detected usage patterns and behaviors. An insight service or module acting in conjunction with calendar applications (or calendar services) of different users may collect calendar information, usage pattern, behavior, and other relevant information such as exchanged communication, shared documents, etc. The insight service or module may make an inference to determine a need to schedule a meeting for a user with another user. A deadline for the meeting and user availability may be determined, and a shared calendar with available meeting times may be suggested to the other user. Upon selection of one of the available meeting times, the selected meeting time may be incorporated to the user's calendar.

14 Claims, 7 Drawing Sheets

(56) References Cited

U.S. PATENT DOCUMENTS

| | | | |
|---|---|---|---|
| 9,262,180 B2 | 2/2016 | Menon et al. | |
| 2003/0097288 A1* | 5/2003 | Shimomura | G06Q 10/1093 705/7.18 |
| 2004/0003042 A1* | 1/2004 | Horvitz | G06Q 10/109 709/204 |
| 2005/0015295 A1* | 1/2005 | McCulloch | G06Q 10/109 705/5 |
| 2005/0021485 A1 | 1/2005 | Nodelman et al. | |
| 2005/0165631 A1* | 7/2005 | Horvitz | G06Q 10/06311 705/7.16 |
| 2006/0136357 A1* | 6/2006 | Rasmussen | G06Q 10/10 |
| 2008/0140498 A1* | 6/2008 | Setty | G06Q 10/109 705/7.18 |
| 2009/0037914 A1* | 2/2009 | Chagoly | G06F 11/302 718/101 |
| 2009/0089751 A1 | 4/2009 | Raikes et al. | |
| 2010/0049808 A1* | 2/2010 | Rosenberg | G06Q 10/10 709/206 |
| 2010/0088144 A1* | 4/2010 | Collet | G06Q 10/06311 705/7.13 |
| 2010/0162105 A1* | 6/2010 | Beebe | G06Q 10/109 715/273 |
| 2012/0069131 A1* | 3/2012 | Abelow | G06Q 10/067 348/14.01 |
| 2012/0179981 A1* | 7/2012 | Whalin | H04W 4/21 715/753 |
| 2012/0303477 A1 | 11/2012 | Ben-itzhak | |
| 2014/0143086 A1 | 5/2014 | Birsin et al. | |
| 2014/0149249 A1 | 5/2014 | Goad et al. | |
| 2014/0297318 A1* | 10/2014 | Prasad | G06Q 10/1095 705/3 |
| 2014/0358613 A1* | 12/2014 | Libin | G06Q 10/1095 705/7.19 |
| 2015/0058056 A1* | 2/2015 | Comerford | G06Q 10/1095 705/7.19 |
| 2015/0058324 A1* | 2/2015 | Kauwe | G06Q 50/01 707/722 |
| 2016/0254942 A1* | 9/2016 | de Luna | G06F 9/44584 709/212 |

OTHER PUBLICATIONS

Burke, Zara, "A Guide to Announcing Your New Features", https://docs.intercom.com/engaging-your-customers/retain-your-users/a-guide-to-announcing-your-new-features, Retrieved on: Dec. 30, 2016, 5 pages.

"15 Methods for Educating Customers About Your New Services and Products", http://www.huffingtonpost.com/young-entrepreneur-council/15-methods-for-educating_b_10968478.html, Published on: Jul. 28, 2016, 6 pages.

"Personalized Behavioral Pop-ups", http://www.nosto.com/features/popups/, Retrieved on: Dec. 30, 2016, 14 pages.

"Targeted Recommendations to Convert Visitors into Paying Customers.", http://web.archive.org/web/20160804113248/https:/beeketing.com/personalized-recommendation, Published on: Aug. 4, 2016, 4 pages.

"International Search Report and Written Opinion Issued in PCT Application No. PCT/US2018/015806", dated Mar. 22, 2018, 8 Pages.

\* cited by examiner

INSIGHT FRAMEWORK FOR SUGGESTING HOSTED SERVICE AND FEATURES BASED ON DETECTED USAGE PATTERNS AND BEHAVIORS

BACKGROUND

Calendar applications are some of the many software tools to assist people with their busy days and tasks by allowing people to schedule events such as meetings, tasks, appointments, etc. Modern calendar applications are typically much more than a scheduling tool and provide a wide variety of functionality and features. Yet, a majority of scheduling operations are manual, where someone sends an invitation for an event and the recipient has to accept or reject.

In an increasingly busy work and personal environment, people's calendars are usually filled with meetings, appointments, and similar events. Furthermore, increased collaborative features and access allow others to schedule meetings and other events easily resulting in diminished control of a person over his or her own daily schedule. Time slots in a person's schedule may be double booked and meetings may be scattered at various times, which may become disruptive for the person when trying to complete tasks.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an insight framework for suggesting hosted service and features based on detected usage patterns and behaviors. In some examples, user information including calendar information, usage pattern, behavior, and other relevant information may be received. An inference may be made for a need to schedule a meeting for the user with another user based on the received information. A deadline for the meeting and user availability may be determined, and a shareable calendar with available meeting times may be suggested to the other user. Upon selection of one of the available meeting times, the selected meeting time may be incorporated to the user's calendar. Relevant information and/or documents may be included along with the scheduled meeting.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
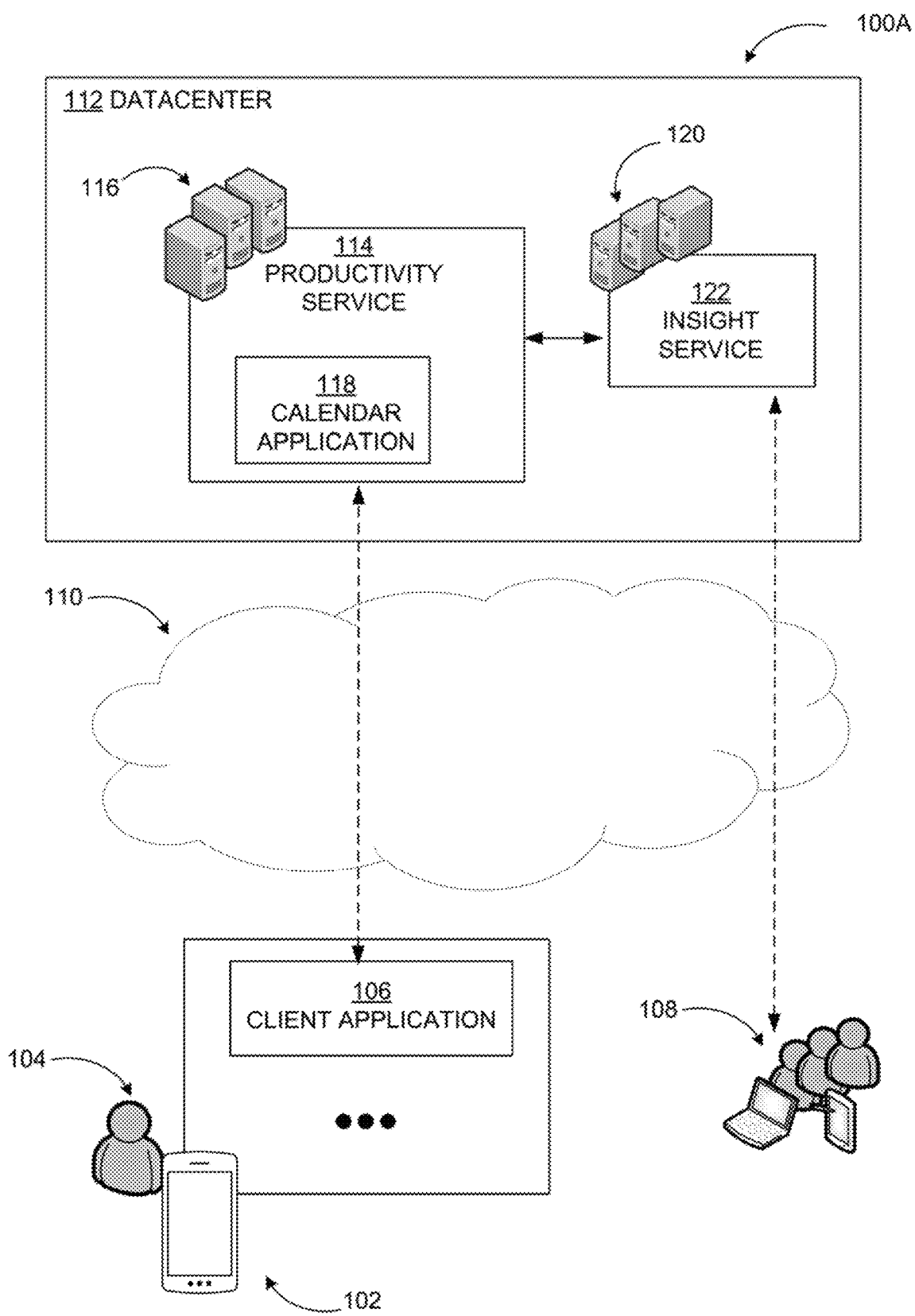
FIGS. 1A-1B include display diagrams illustrating example network environments where an insight framework for suggesting hosted service and features based on detected usage patterns and behaviors may be implemented.

As briefly described above, embodiments are directed to an insight framework for suggesting hosted service and features based on detected usage patterns and behaviors. An insight service or module acting in conjunction with calendar applications (or calendar services) of different users may collect calendar information, usage pattern, behavior, and other relevant information such as exchanged communication, shared documents, etc. The insight service or module may make an inference to determine a need to schedule a meeting for a user with another user. A deadline for the meeting and user availability may be determined, and a shared calendar with available meeting times may be suggested to the other user. Upon selection of one of the available meeting times, the selected meeting time may be incorporated to the user's calendar.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide an insight framework for suggesting hosted service and features based on detected usage patterns and behaviors. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
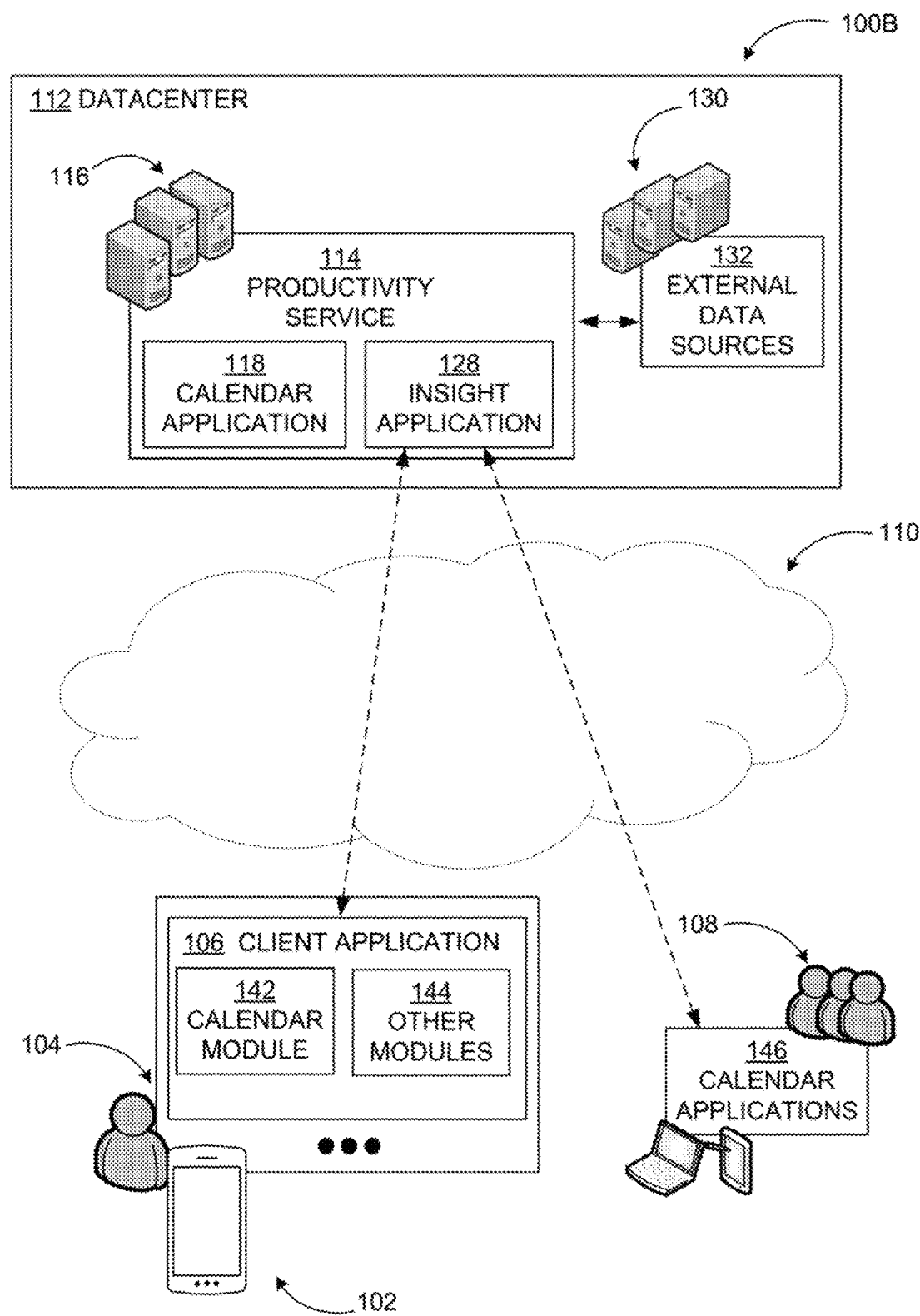

FIGS. 1A-1B include display diagrams illustrating example network environments where an insight framework for suggesting hosted service and features based on detected usage patterns and behaviors may be implemented.

As illustrated in diagrams 100A-B, an example system may include a datacenter 112 hosting a cloud-based productivity service 114 configured to enable users to create, edit, and/or share content among multiple devices and across a variety of platforms. The datacenter 112 may include one or more processing servers 116 configured to execute the productivity service 114, among other components. The datacenter 112 or another datacenter may execute an insight service 122 on servers 120 to provide a framework for suggesting calendar events based on detected usage patterns and behaviors in conjunction with the productivity service 114. As described herein, the productivity service 114 and the insight service 122 may be implemented as software, hardware, or combinations thereof.

In some embodiments, the productivity service 114 may be configured to interoperate with various applications. For example, as illustrated in the diagrams 100A-B, a user 104 may execute a thin (e.g., a web browser) or a thick (e.g., a locally installed client application) version of an application 106 through a device 102 with which the productivity service 114 may be configured to integrate and interoperate with over one or more networks, such as network 110. The application 106 may be an application hosted by the productivity service 114. The application 106 may be configured to provide specific services such as scheduling, calendar management, task management, and similar ones. As such, the application 106 may be a communication application or a calendar application, among other examples, and communicate with a component of the productivity service 114 such as calendar application 118. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In one embodiment, as illustrated in diagram 100A, at least one of the processing servers 116 may be operable to execute a calendar application 118 of the productivity service 114, where the calendar application 118 may be integrated with the productivity service 114.

In another embodiment, as illustrated in diagram 100B, the application 106 may be operable to execute a calendar module 142 along with other modules 144 such as a tasks module, a notes module, etc. In the example configuration of diagram 100B, the insight framework may be provided by an insight application 128 within the productivity service 114 instead of being a separate service as in FIG. 1A. The insight application 128 may collect information from the modules of the application 106, from external data sources 132 residing on servers 130, and even from calendar applications 146 of other users 108. The collected information may include calendar information, usage pattern, behavior, and other relevant information such as upcoming events, deadlines, and so on.

The insight application 128 may then determine suitable times (based on the availability of the user 104) and generate a shareable calendar with suggested times and other relevant meeting information to the users 108 through the calendar applications 146. Upon receiving a selection, the insight application 128 may enable the calendar application 118 to incorporate the selected meeting time to the user's calendar.

Some of the actions and/or processes described herein have been illustrated from the perspective of a server (for example, the processing servers 116 configured to execute the productivity service 114), however similar actions may be performed similarly by a client (for example, the application 106), among other entities.

Technical advantages of an insight framework for suggesting hosted service and features based on detected usage patterns and behaviors may include improved performance, reduced processing and network bandwidth usage, and improved user interaction, as well as enhanced communal productivity and efficiency.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with calendar and scheduling activities through services hosted across a variety of platforms and devices.

Figure 2:
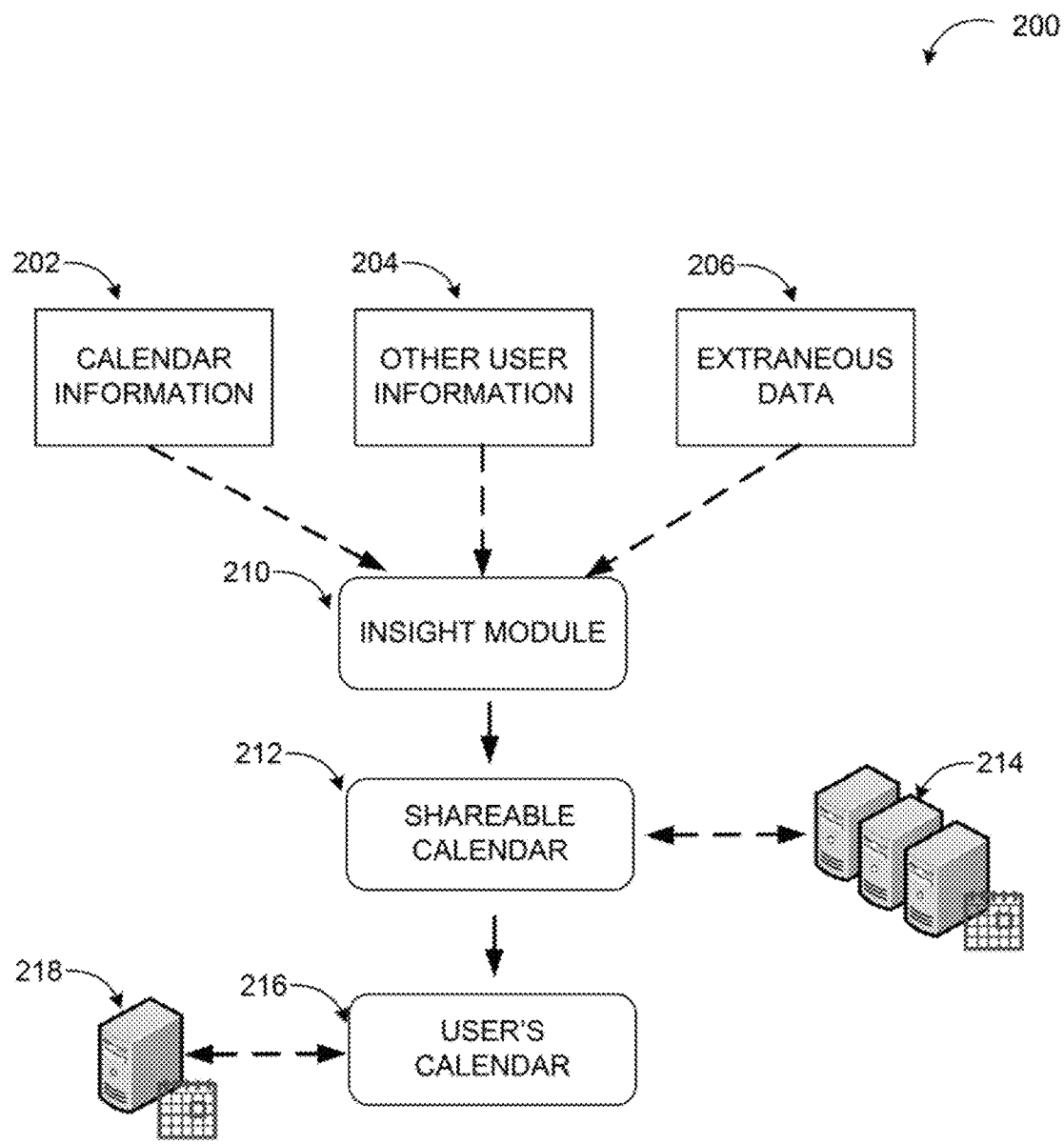
FIG. 2 includes a display diagram illustrating an example scheme to implement an insight framework for suggesting hosted service and features based on detected usage patterns and behaviors.

FIG. 2 includes a display diagram illustrating an example scheme to implement an insight framework for suggesting hosted service and features based on detected usage patterns and behaviors.

As shown in diagram 200, an insight module 210 may be configured to collect information associated with a user and determine a need to schedule a meeting with another user (e.g., based on inference). The insight module 210 may be part of an independent insight service or part of a hosted service such as a productivity service that includes a calendar application. In conjunction with the calendar application, the insight module 210 may determine a deadline for the meeting to be scheduled, user availability and generate a shareable calendar 212, which may be provided automatically or manually to calendar application(s) associated with the other user(s) (e.g., executed on servers 214). Upon receiving a selection (or multiple selections) from the other user(s), the insight module 210 in conjunction with the user's calendar application executed on server 218 may incorporate the selected meeting to the user's calendar 216.

The collected information may include the user's calendar information 202, other user information 204 such as usage history, behavior, user's communications with the other user(s), collaborated documents, common memberships, and comparable data. The collected information may further include extraneous data 206 such as upcoming deadlines, events, and similar data. The insight module 210 may use the collected information to determine the need for the meeting through inference or similar processes. For example, a variety of machine-learning techniques, neural networks, and similar algorithms may be used to determine the need. The insight module 210 may also use the information to select relevant materials and data to be included in the meeting (e.g., meeting invite).

In one example scenario, the user may be a tax professional such as a certified professional accountant. An insight service to which the user subscribes may determine that tax return deadline (e.g., April 15) is approaching and start analyzing information with the user's clients. Based on analyzing calendar information, communications, exchanged documents, etc., the insight service may determine that for one client, the user may prefer to hold a meeting about one month prior to the tax deadline while for another client more time may be needed. Thus, the insight service, in conjunction with the user's calendar application, may determine available times for the user a month before the tax deadline and two months before. Then, the insight service may cause the calendar application to generate a shareable calendar with the user's available times and provide the shareable calendar to the clients. Upon receiving selections of the clients, the insight service may cause the user's calendar application to incorporate the meetings into the user's calendar. The insight service may also provide links to the individual clients' tax documents, latest tax forms, etc. to the calendar application to be included in the meeting invites.

In some embodiments, the user and the other user(s) may have separate calendar applications or be part of separate hosted services. Thus, the insight module or service may coordinate exchange of information and scheduling of the meeting(s) across distinct services. In other embodiments, the user and the other user(s) may be part of the same hosted service (e.g., productivity service). However, their calendars may not be public. Thus, the insight service may make calendar information (availability) public through the shareable calendar and incorporate into the user and the other user(s)'s calendars.

While a productivity service is used as an illustrative example herein, embodiments may be implemented in other service environments as well. Other services that may provide time block categorization in calendars may include, but are not limited to, scheduling services, collaborative services, communication services, and others with scheduling components. Additionally, the actions and/or processes described herein have been illustrated from the perspective of a server, however similar actions may be performed similarly by a client application, among other entities.

Figure 3:
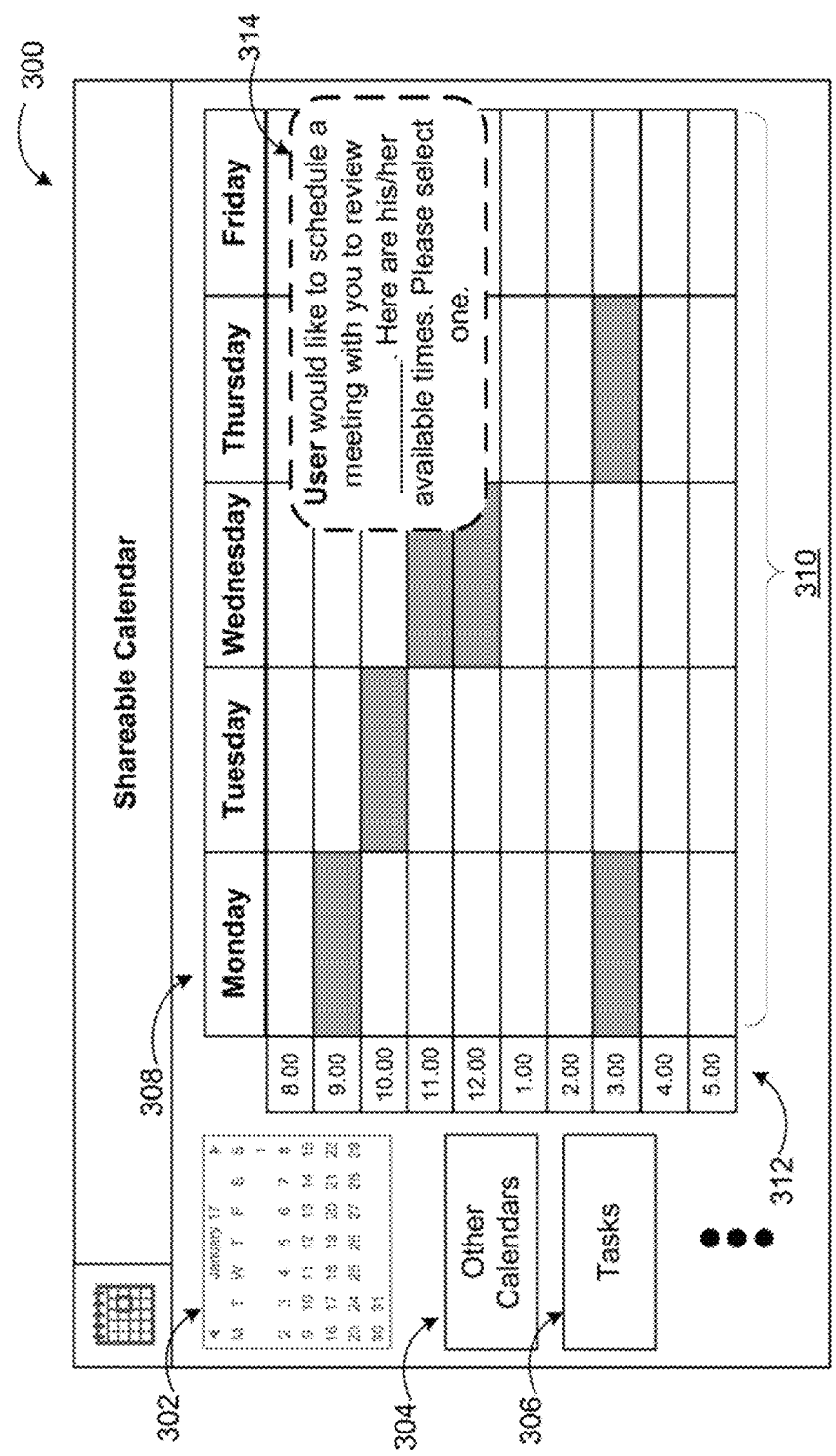
FIG. 3 includes an example calendar user interface illustrating suggestion of a shareable calendar according to some embodiments.

FIG. 3 includes an example calendar user interface illustrating suggestion of a shareable calendar according to some embodiments.

Diagram 300 of FIG. 3 shows an example calendar application user interface with a weekly calendar view displaying work days. The calendar application user interface may also include summary calendar view 302, links to other calendars 304, summary view or links to tasks 306, and so on. The calendar view may have a top row listing the days 308 and a first column listing the hours 312.

As discussed herein, an insight service or application may collect information associated with a user including, but not limited to, calendar information, usage history, behavior information, and external information associated with upcoming deadlines, events, etc. The insight service or application may then enable the calendar application to generate a shareable calendar as shown in diagram 300 with the available dates and times for the user to hold a meeting or appointment with another user. The shareable calendar may be provided to the other user along with the message 314 explaining the reason for the meeting. The other user may select one of the available times. Upon receiving the selection, the calendar application may incorporate the meeting at the selected date and time to the user's calendar.

In some embodiments, the meeting request (shareable calendar) may be sent to multiple other users. In such a scenario, the other users may be asked to make multiple selections such that a common date and time for the meeting can be established and incorporated into the user's calendar. In other embodiments, the calendar application in conjunction with the insight service or application may include relevant material and information in the meeting. For example, relevant documents, images, links, and other information may be included to enhance efficiency and productivity of the users with respect to the meeting.

The examples provided in FIG. 1A through FIG. 3 are illustrated with specific systems, services, applications, modules, and user experiences. Embodiments are not limited to environments according to these examples. An insight framework for suggesting hosted service and features based on detected usage patterns and behaviors may be implemented in environments employing fewer or additional systems, services, applications, modules, and user experiences. Furthermore, the example systems, services, applications, modules, and user experiences shown in FIG. 1A through FIG. 3 may be implemented in a similar manner with other values using the principles described herein.

Figure 4:
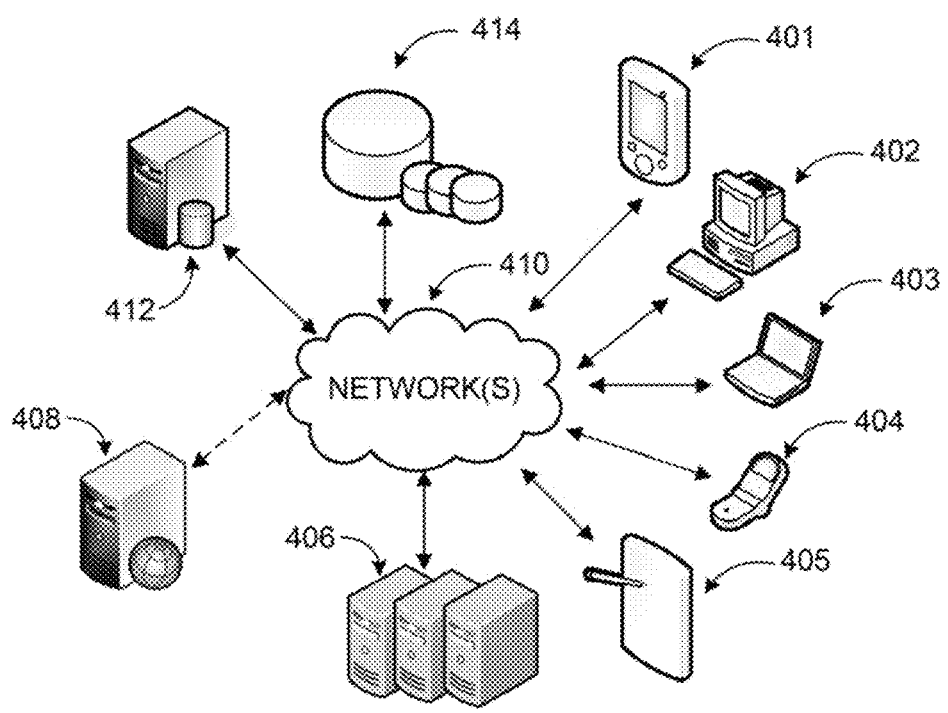
FIG. 4 is an example networked environment, arranged in accordance with at least some embodiments described herein.

FIG. 4 is an example networked environment, arranged in accordance with at least some embodiments described herein.

In addition to locally installed applications (for example, application 106), a calendar may also be employed in conjunction with hosted applications and services (for example, a productivity service 114) that may be implemented via software executed over one or more servers 406 or individual server 408, as illustrated in diagram 400. A hosted service or application may communicate with client applications on individual computing devices such as a handheld computer 401, a desktop computer 402, a laptop computer 403, a smart phone 404, a tablet computer (or slate), 404 ('client devices') through network(s) 410 and control a user interface presented to users.

Client devices 401-404 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, engines, and modules may be employed to provide an insight framework for suggesting hosted service and features based on detected usage patterns and behaviors. Furthermore, the networked environments discussed in FIG. 4 are for illustration purposes only. Embodiments are not limited to the example services, applications, engines, modules or processes.

Figure 5:
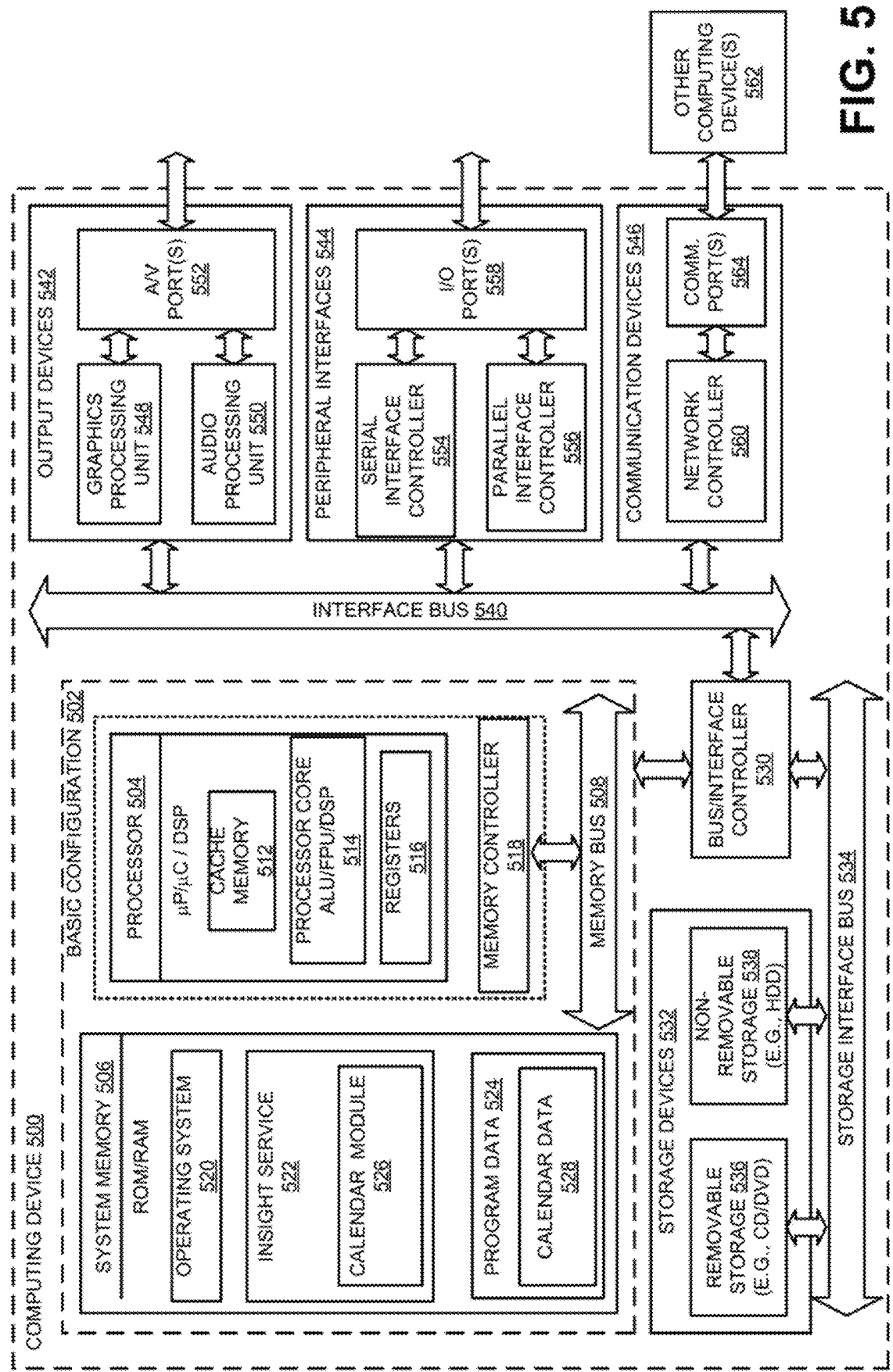
FIG. 5 illustrates a general purpose computing device, which may be configured to provide an insight framework for suggesting hosted service and features based on detected usage patterns and behaviors, arranged in accordance with at least some embodiments described herein.

FIG. 5 illustrates a general purpose computing device, which may be configured to provide an insight framework for suggesting hosted service and features based on detected usage patterns and behaviors, arranged in accordance with at least some embodiments described herein.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (ttP), a microcontroller (pC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an insight service 522, and program data 524. The insight service 522 may include a calendar module 526, which may be an integrated module of the insight service 522. In other embodiments, the calendar module 526 may be an integrated module of a locally installed application of the insight service 522 or the calendar module 526 may be a separate module associated with a third party service configured to serve multiple applications of a productivity service. The calendar module 526 may be configured to collect user information including calendar information, usage pattern, behavior, and other relevant information. An inference may be made for a need to schedule a meeting for the user with another user based on the received information. A deadline for the meeting and user availability may be determined, and a shareable calendar with available meeting times may be suggested to the other user. Upon selection of one of the available meeting times, the selected meeting time may be incorporated to the user's calendar. The program data 524 may include, among other data, calendar data 528 such as meeting data, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 505, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide an insight framework for suggesting hosted service and features based on detected usage patterns and behaviors. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
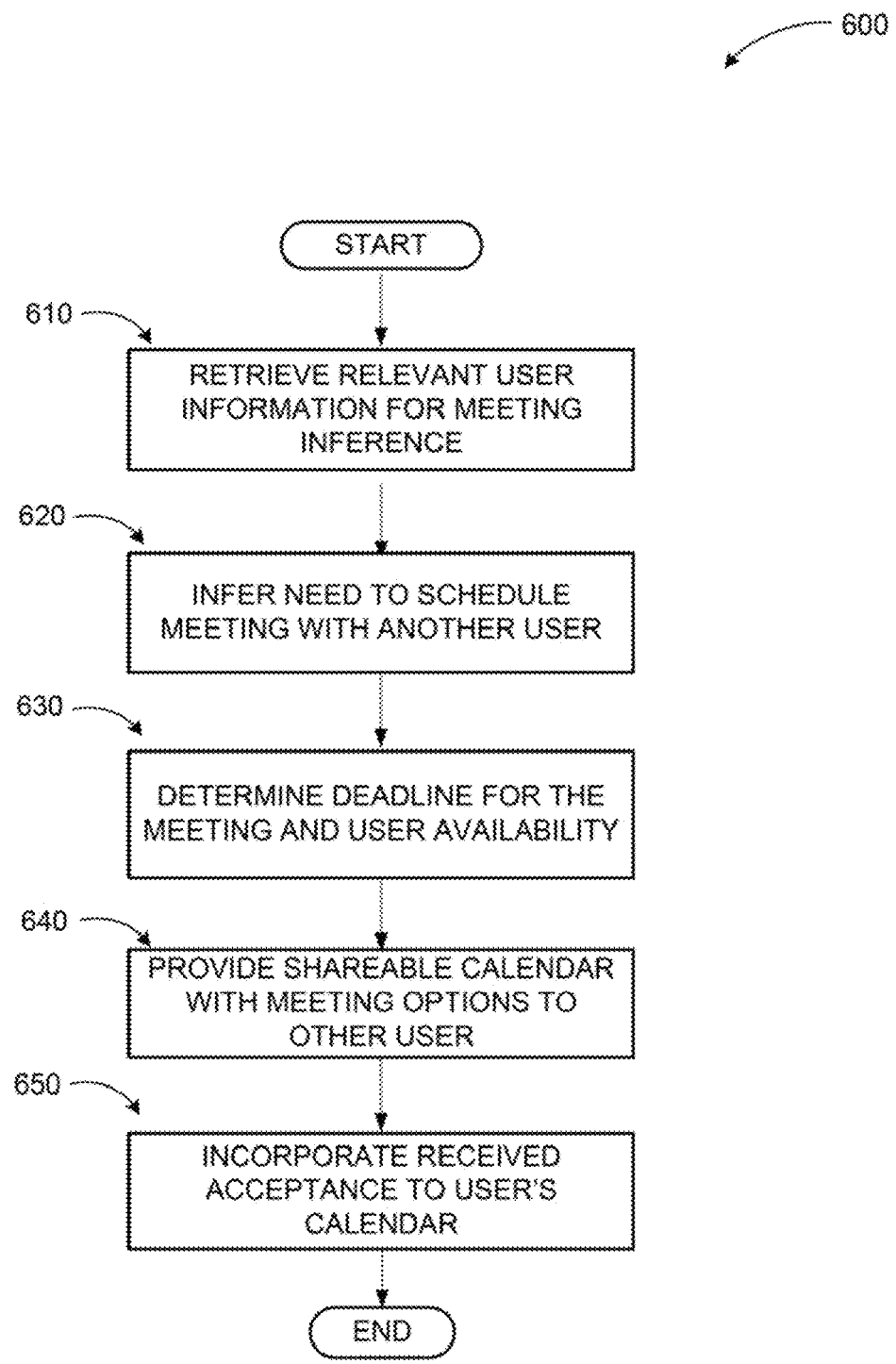
FIG. 6 illustrates a logic flow diagram for an example process to provide an insight framework for suggesting hosted service and features based on detected usage patterns and behaviors.

FIG. 6 illustrates a logic flow diagram for an example process to provide an insight framework for suggesting hosted service and features based on detected usage patterns and behaviors, arranged in accordance with at least some embodiments described herein.

Process 600 may be implemented on a computing device, server, or other system. An example system may include a communication interface configured to facilitate communication between a productivity service and an insight service, a memory configured to store instructions, and one or more processors coupled to the memory and configured to execute a calendar module, where the calendar module is configured to schedule meetings in conjunction with the insight service.

Process 600 begins with operation 610, where the insight service may retrieve information associated with a user such as calendar information, usage history, user behavior, and external information such as upcoming events, deadlines, and similar ones. At operation 620, the insight service may make an inference about a need to schedule a meeting or similar event (appointment, task, etc.) between the user and another user based on the retrieved information. At operation 630, the insight service may determine a deadline for the meeting and user availability prior to the determined deadline.

At operation 640, the calendar module may generate a shareable calendar with one or more meeting options based on the user availability and input from the insight service. The shareable calendar may be provided to the other user for selection of one of the available options. Upon receiving the selection from the other user, the calendar module may incorporate the selected meeting into the user's calendar at operation 650. In some embodiments, the meeting may be arranged with multiple other users. In such scenarios, a commonly selected meeting date and time may be determined as the meeting time and date.

The operations included in process 600 are for illustration purposes. An insight framework for suggesting hosted service and features based on detected usage patterns and behaviors may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing scheduling services based on usage patterns and behavior is described. The means may include a means for retrieving relevant user information for meeting inference; a means for inferring a need to schedule a meeting between and first user and a second user based on the retrieved relevant user information; a means for determining a deadline for the needed meeting and an availability of the first user; a means for providing a shareable calendar to the second user with meeting options for the needed meeting; and upon receiving a selection among the meeting options, a means for incorporating the selected meeting option to the first user's calendar.

According to some examples, a method to provide scheduling services based on usage patterns and behavior is described. The method may include retrieving relevant user information for meeting inference; inferring a need to schedule a meeting between and first user and a second user based on the retrieved relevant user information; determining a deadline for the needed meeting and an availability of the first user; providing a shareable calendar to the second user with meeting options for the needed meeting; and upon receiving a selection among the meeting options, incorporating the selected meeting option to the first user's calendar.

According to other examples, the method may also comprise including at least a portion of the relevant user information in a meeting invite for the scheduled meeting. The method may further comprise including external information in the meeting invite for the scheduled meeting. The at least a portion of the relevant user information and the external information may include one or more of a document and a link. The relevant user information may include one or more of calendar information associated with the first user, a usage history of the first user, and behavior information associated with the first user.

According to further examples, the relevant user information may further include one or more of communications exchanged between the first user and the second user, collaborated documents between the first user and the second user, and common memberships of the first user and the second user. The relevant user information may further include an extraneous deadline and upcoming event information. Determining the deadline for the needed meeting may include determining the deadline based on one or more of the relevant user information, information associated with the second user, and an upcoming event. The method may also include determining two or more meeting options based on the determined deadline and the availability of the first user. Providing the shareable calendar to the second user may include rendering a portion of the first user's calendar public.

According to other examples, a computing device to provide scheduling services based on usage patterns and behavior is described. The computing device may include a communication interface configured to facilitate communication between the computing device and one or more servers and other computing devices; a memory configured to store instructions; and one or more processors coupled to the memory and the communication interface. The one or more processors may be configured to execute an insight module, where the insight module is configured to retrieve relevant user information for meeting inference; infer a need to schedule a meeting between and first user and a second user based on the retrieved relevant user information; determine a deadline for the needed meeting and an availability of the first user; cause a calendar application of the first user to provide a shareable calendar to the second user with meeting options for the needed meeting; upon receiving a selection among the meeting options, cause the calendar application of the first user to incorporate the selected meeting option to the first user's calendar; and cause the calendar application of the first user and another calendar application of the second user to include at least a portion of the relevant user information and external information in a meeting invite tfor the scheduled meeting.

According to some examples, the relevant user information may include one or more of calendar information associated with the first user, a usage history of the first user, behavior information associated with the first user, communications exchanged between the first user and the second user, collaborated documents between the first user and the second user, common memberships of the first user and the second user, an extraneous deadline, and upcoming event information.

According to other examples, the insight module may be part of an insight service communicatively coupled to a calendar service, and the calendar application of the first user may be part of the calendar service. The insight module and the calendar application of the first user may also be part of a productivity service. The calendar application of the first user and the calendar application of the second user may alternatively be part of two distinct hosted services, and the insight module may be configured to coordinate exchange of information between the calendar application of the first user and the calendar application of the second user. Yet, the calendar application of the first user and the calendar application of the second user may be part of a same hosted service, and the insight module may be configured to cause the calendar application of the first user to render a private portion of the first user's calendar visible to the second user.

According to further examples, a computer-readable memory device with instructions stored thereon, which when executed by a computing device cause the computing device to provide scheduling services based on usage patterns and behavior is described. The instructions may include retrieving relevant user information for meeting inference, where the relevant user information includes one or more of calendar information associated with a first user, a usage history of the first user, behavior information associated with the first user, communications exchanged between the first user and other users, collaborated documents between the first user and the other users, common memberships of the first user and the other users, an extraneous deadline, and upcoming event information; inferring a need to schedule a meeting between and first user and the other users based on the retrieved relevant user information; determining a deadline for the needed meeting and an availability of the first user; providing a shareable calendar to the other users with meeting options for the needed meeting; upon receiving a plurality of selections among the meeting options, determining a suitable meeting option for the first user and the other users based on the plurality of selections; and incorporating the suitable meeting option to the first user's calendar.

According to some examples, providing the shareable calendar to the other users may include providing the meeting options for selection, if the first user and the other users are part of different calendar services. Providing the shareable calendar to the other users may further include rendering a private portion of the first user's calendar public, if the first user and the other users are part of a same calendar service. Providing the shareable calendar to the other users may also include providing the shareable calendar and a message to the other users to the first user to be transmitted to the other users.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide scheduling services based on usage patterns and behavior, the method comprising:
    retrieving, with one or more processors, relevant user information for meeting inference, wherein the relevant user information includes one or more of communications exchanged between a first user and a second user, collaborated documents between the first user and the second user, and common memberships of the first user and the second user;
    inferring, with the one or more processors, a need to schedule a meeting between the first user and the second user based on the retrieved relevant user information;
    determining, with one or more processors, a deadline for the meeting and available time slots of the first user;
    determining a portion of the first user's private calendar to render public for access by the second user by identifying a plurality of time slots representing meeting options for the meeting based on the deadline and the available time slots of the first user, each of the plurality of time slots occurring prior to the deadline and being included in the available time slots of the first user;
    generating, with one or more processors, a user interface, the user interface including the determined portion of the first user's private calendar rendered public for access by the second user, wherein the plurality of time slots representing meeting options for the meeting are marked within the portion of the first user's private calendar rendered public for access by the second user;
    providing, with the one or more processors, the user interface including the portion of the first user's private calendar rendered public within a calendar application accessible by the second user; and
    in response to receiving a selection among the plurality of time slots marked as meeting options from the second user through the user interface,
        automatically, with the one or more processors, scheduling the meeting on a calendar of the first user and a calendar of the second user and including at least a portion of the relevant user information in a meeting invite for the scheduled meeting.

2. The method of claim 1, further comprising:
    including external information in the meeting invite for the scheduled meeting.

3. The method of claim 2, wherein the at least a portion of the relevant user information and the external information include one or more of a document and a link.

4. The method of claim 1, wherein the relevant user information includes one or more of calendar information associated with the first user, a usage history of the first user, and behavior information associated with the first user.

5. The method of claim 1, wherein the relevant user information further includes an extraneous deadline and upcoming event information.

6. The method of claim 1, wherein determining the deadline for the meeting comprises:
    determining the deadline based on one or more of the relevant user information, information associated with the second user, and an upcoming event.

7. A computing device to provide scheduling services based on usage patterns and behavior, the computing device comprising:
- a communication interface configured to facilitate communication between the computing device and one or more servers and other computing devices;
- a memory configured to store instructions; and
- one or more processors coupled to the memory and the communication interface, the one or more processors configured to execute an insight module, wherein the insight module is configured to:
  - retrieve relevant user information for meeting inference, wherein the relevant user information includes one or more of communications exchanged between a first user and a second user, collaborated documents between the first user and the second user, and common memberships of the first user and the second user;
  - infer a need to schedule a meeting between the first user and the second user based on the retrieved relevant user information;
  - determine a deadline for the meeting and available time slots of the first user;
  - determine a portion of the first user's private calendar to render public for access by the second user by identifying a plurality of time slots representing meeting options for the meeting based on the deadline and the available time slots representing meeting options for the meeting based on the deadline and the available time slots of the first user, each of the plurality of time slots occurring prior to the deadline and being included in the available time slots of the first user;
  - generate a user interface, the user interface including the determined portion of the first user's private calendar rendered public for access by the second user, wherein the plurality of time slots representing meeting options for the meeting are marked within the portion of the first user's private calendar rendered public for access by the second user;
  - provide the user interface including the portion of the first user's private calendar rendered public within a calendar application accessible by the second user; and
  - in response to receiving a selection among the plurality of time slots marked as meeting options from the second user through the user interface, automatically schedule the meeting on a calendar of the first user and a calendar of the second user and include at least a portion of the relevant user information in a meeting invite for the scheduled meeting.

8. The computing device of claim 7, wherein the relevant user information includes one or more of calendar information associated with the first user, a usage history of the first user, behavior information associated with the first user, an extraneous deadline, and upcoming event information.

9. The computing device of claim 7, wherein the insight module is part of an insight service communicatively coupled to a calendar service, and the calendar application of the first user is part of the calendar service.

10. The computing device of claim 7, wherein the insight module and the calendar application of the first user are part of a productivity service.

11. The computing device of claim 7, wherein the calendar application of the first user and the calendar application of the second user are part of two distinct host services, and the insight module is configured to coordinate exchange of information between the calendar application of the user and the calendar application of the second user.

12. The computing device of claim 7, wherein the calendar application of the first user and the calendar application of the second user are part of two distinct hosted services, and the insight module is configured to coordinate exchange of information between the calendar application of the first user and the calendar application of the second user.

13. A non-transitory computer-readable memory device with instructions stored thereon, which when executed by a computing device cause the computing device to provide scheduling services based on usage patterns and behavior, the instructions comprising:
- retrieving relevant user information for meeting inference, wherein the relevant user information includes one or more of communications exchanged between the first user and other users, collaborated documents between the first user and other users, and common memberships of the first user and other users;
- inferring a need to schedule a meeting between the first user and the other users based on the retrieved user information;
- determining a deadline for the meeting and available time slots of the first user;
- determining a portion of the first user's private calendar to render public for access by the second user by identifying a plurality of time slots representing meeting options for the meeting based on the deadline and the available time slots of the first user, each of the plurality of time slots occurring prior to the deadline and being included in the available time slots of the first user;
- generating a user interface, the user interface including the determined portion of the first user's private calendar rendered public for access by the second user, wherein the plurality of time slots representing meeting options for the meeting are marked within the portion of the first user's private calendar rendered public for access by the second user;
- providing the user interface including the portion of the first user's calendar private rendered public within a calendar application accessible by the second user; and
- in response to receiving a selection among the plurality of time slots marked as meeting options from the second user through the user interface, automatically scheduling the meeting on the calendar of the first user and a calendar of the second user and including at least a portion of the relevant user information in a meeting invite for the scheduled meeting.

14. The non-transitory computer-readable memory device of claim 13, wherein providing the sharable calendar to the other users comprises:
- providing the sharable calendar and a message to the other users to the first user to be transmitted to the other users.

* * * * *